US006243005B1

(12) United States Patent
Haimovich et al.

(10) Patent No.: US 6,243,005 B1
(45) Date of Patent: Jun. 5, 2001

(54) SELF-LOCKING SEAL

(75) Inventors: Yosef Haimovich, Rishon le Zion; Yehuda Armoni, Reut; Michael Auerbach, Maccabim, all of (IL)

(73) Assignee: Hi-F-Tek Ltd., Or-Yehuda (IL)

( * ) Notice: Subject to any disclaimer, the term of this patent is extended or adjusted under 35 U.S.C. 154(b) by 0 days.

(21) Appl. No.: 09/368,285

(22) Filed: Aug. 3, 1999

(30) Foreign Application Priority Data

Aug. 3, 1998 (IL) ..................................................... 125644
Nov. 5, 1998 (IL) ..................................................... 126928

(51) Int. Cl.[7] .................................................... B60R 25/10
(52) U.S. Cl. ....................... 340/427; 340/432; 340/568.1; 340/571
(58) Field of Search .................................... 340/540, 542, 340/545.1, 545.2, 545.7, 546, 548, 568.1, 568.2, 568.3, 568.4, 568.7, 571, 572.9, 427, 432; 242/287, 421.5; 324/509

(56) References Cited

U.S. PATENT DOCUMENTS

| | | | | |
|---|---|---|---|---|
| 3,913,010 | * | 10/1975 | Scarpino | 324/509 |
| 4,748,668 | | 5/1988 | Shamir et al. | 380/30 |
| 4,920,334 | * | 4/1990 | DeVolpi | 340/568.6 |
| 5,097,253 | | 3/1992 | Eschbach et al. | 340/545.1 |
| 5,270,681 | * | 12/1993 | Jack | 340/427 |
| 5,408,212 | * | 4/1995 | Mayers et al. | 340/427 |
| 5,408,213 | * | 4/1995 | Ungarsohn | 340/427 |
| 5,749,533 | * | 5/1998 | Daniels | 242/287 |
| 5,786,759 | | 7/1998 | Ling | 340/542 |
| 5,836,002 | * | 11/1998 | Morstein et al. | 340/427 |
| 5,917,405 | * | 6/1999 | Joao | 340/426 |

FOREIGN PATENT DOCUMENTS 0 773 521 5/1997 (EP) .

* cited by examiner

*Primary Examiner*—Van T. Trieu
(74) *Attorney, Agent, or Firm*—Abelman, Frayne & Schwab

(57) ABSTRACT

An electronic seal including a housing, alarm circuitry which when actuated provides an alarm signal, a wire extending from the housing and in electrical communication with the alarm circuitry, a locking element which selectively lockingly engages the wire to the housing, and a switch external to the housing in electrical communication with the locking element which selectively unlocks the locking element to release the wire. There is also provided an electronic seal including a housing including alarm circuitry, the alarm circuitry when actuated providing an alarm signal, a wire extending from the housing and in electrical communication with the alarm circuitry, the wire being attached at a first point and at a second point thereof to the housing, a portion of the wire between the first and second points, called a tying portion, being suitable for tying an object, wherein tampering with the tying portion actuates the alarm circuitry, and an adjustment device for adjusting a length of the tying portion.

22 Claims, 7 Drawing Sheets

SELF-LOCKING SEAL

FIELD OF THE INVENTION

The present invention relates to electronic seals generally, and particularly to a self-locking electronic seal.

BACKGROUND OF THE INVENTION

Electronic tags are known that can be attached to an object and monitored, sensed, or interrogated for purposes of preventing theft of or tampering with the object. For example, applicant/assignee's U.S. patent application Ser. No. 08/815,389, the disclosure of which is incorporated herein by reference, describes a battery-operated electronic seal that, when tampered with, communicates via a transceiver to a detection system for providing an alarm signal or other indication, and thereby detect the tampering and/or removal of the seal from an object sealed or tagged therewith. One of the electronic seals described in U.S. patent application Ser. No. 08/815,389 employs resistive wires which when tampered with provide an indication of such tampering.

SUMMARY OF THE INVENTION

The present invention seeks to provide improvements to the electronic seal described in U.S. patent application Ser. No. 08/815,389 which employs resistive wires. In the seal of the present invention, there is a locking element which selectively lockingly engages a wire, and the locking element can be unlocked only by means of an external switch.

There is thus provided in accordance with a preferred embodiment of the present invention an electronic seal including a housing, alarm circuitry which when actuated provides an alarm signal, a wire extending from the housing and in electrical communication with the alarm circuitry, a locking element which selectively lockingly engages the wire to the housing, and a switch external to the housing in electrical communication with the locking element which selectively unlocks the locking element to release the wire.

In accordance with a preferred embodiment of the present invention the switch is mounted on an external surface of the housing.

Further in accordance with a preferred embodiment of the present invention the switch includes a coded switch.

Still further in accordance with a preferred embodiment of the present invention the external switch includes a remote control device.

Additionally in accordance with a preferred embodiment of the present invention the external switch includes a computer terminal in wireless communication with the housing.

In accordance with a preferred embodiment of the present invention the locking element includes a solenoid which selectively lockingly engages the wire.

Further in accordance with a preferred embodiment of the present invention the solenoid includes a tongue which selectively protrudes from the solenoid and fixedly clamps the wire.

Still further in accordance with a preferred embodiment of the present invention the wire is connected to an electrical jack and the solenoid includes a tongue which selectively protrudes from the solenoid and fixedly clamps the jack.

Additionally in accordance with a preferred embodiment of the present invention the wire is wound around a bobbin and the solenoid selectively fixedly clamps the bobbin, thereby also clamping the wire.

There is also provided in accordance with a preferred embodiment of the present invention an electronic seal including a housing including alarm circuitry, the alarm circuitry when actuated providing an alarm signal, a wire extending from the housing and in electrical communication with the alarm circuitry, the wire being attached at a first point and at a second point thereof to the housing, a portion of the wire between the first and second points, called a tying portion, being suitable for tying an object, wherein tampering with the tying portion actuates the alarm circuitry, and an adjustment device for adjusting a length of the tying portion.

In accordance with a preferred embodiment of the present invention the adjustment device includes a yoke for wrapping therearound the tying, portion.

Further in accordance with a preferred embodiment of the present invention an electrical element is disposed through the yoke, the electrically element being in electrical communication with the alarm circuitry, wherein a change in an electrical parameter of the electrical element is communicated to the alarm circuitry for actuation thereof Still further the adjustment device includes a tightening device to which the wire is attached, the tightening device permitting the wire to be drawn out of and to be pulled into the housing, and substantially fixing the wire at the second point thereof Preferably the tightening device includes a locking element which selectively lockingly engages the wire.

Additionally in accordance with a preferred embodiment of the present invention the tightening device includes a bobbin around which the wire is wound and a locking element which selectively lockingly engages the bobbin.

In accordance with a preferred embodiment of the present invention a portion of the wire forms part of a Wheatstone bridge, in electrical communication with the alarm circuitry, for measuring changes in electrical resistance of the wire.

Additionally in accordance with a preferred embodiment of the present invention the first point is attached to an electrical connector in electrical communication with the alarm circuitry.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
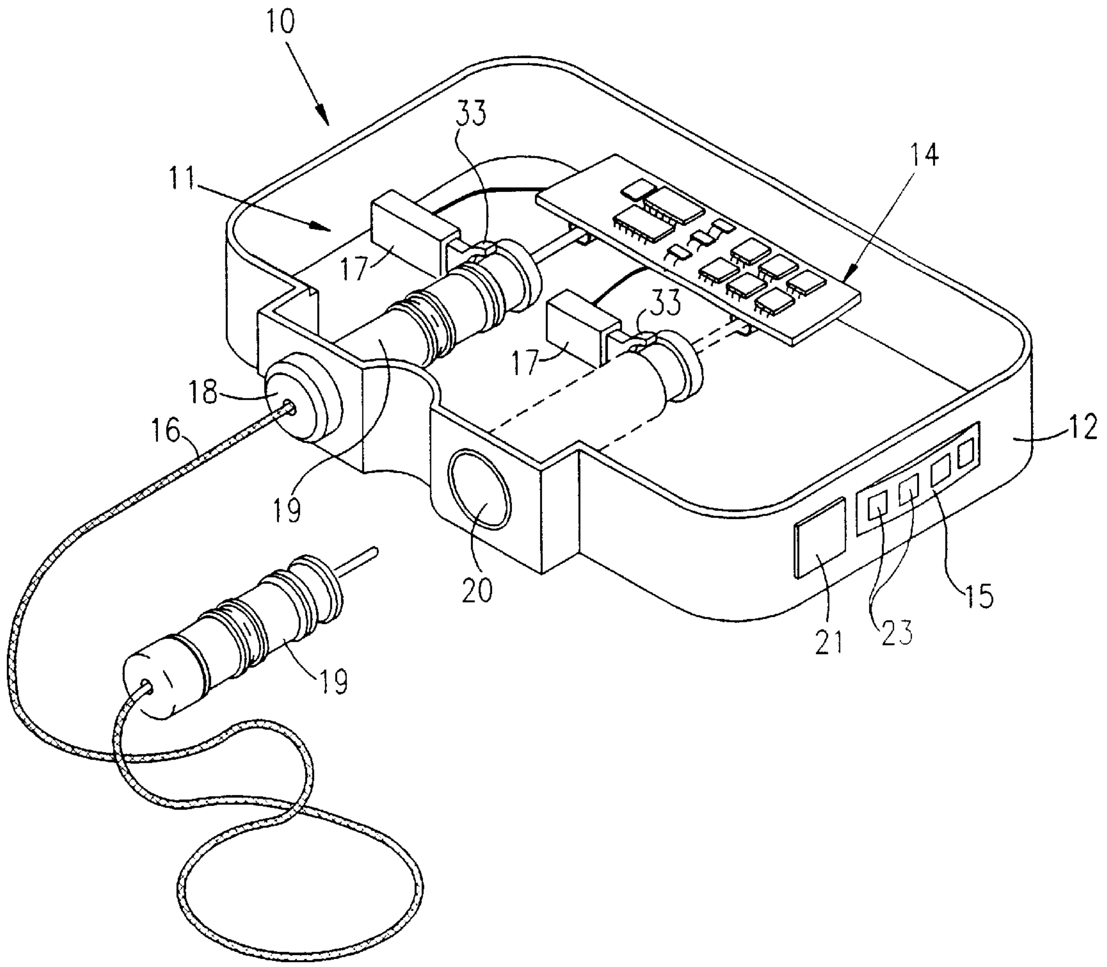
FIG. 1 is a simplified pictorial illustration of an electronic seal constructed and operative in accordance with a preferred embodiment of the present invention with an external switch for unlocking a locking element which selectively lockingly engages a wire.

Reference is now made to FIG. 1 which illustrates an electronic seal 10 constructed and operative in accordance with a preferred embodiment of the present invention.

Electronic seal 10 preferably includes a housing 12 including alarm circuitry 14, which when actuated provides an alarm signal. Alarm circuitry 14 is preferably constructed in accordance with the circuitry disclosed in U.S. patent application Ser. No. 08/815,389.

A wire 16 extends from housing 12 and is in electrical communication with alarm circuitry 14. Wire 16 is attached at a first point 18 and, optionally at a second point 20 thereof, to housing 12. In the illustrated embodiment, first and second points 18 and 20 are electrical sockets mounted on an external surface of housing 12. For convenience, a jack 19 may be attached to one end of wire 16 which fixedly mates with one of these electrical sockets. Tampering with any portion of wire 16 actuates alarm circuitry 14. For example, as taught in U.S. patent application Ser. No. 08/815,389, wire 16 may be a frangible element, such as a shielded wire, which when broken provides an output indication of tampering with seal 10. Alternatively, wire 16 may comprise electrically resistive wire, and tampering with wire 16 causes a change in electrical resistance of the wire, which change is communicated to alarm circuitry 14 for actuation thereof.

Electronic seal 10 preferably includes a locking element 11 which selectively lockingly engages wire 16 to housing 12. In the embodiment of FIG. 1, locking element 11 comprises a solenoid 17 which selectively lockingly engages wire 16. Solenoid 17 preferably includes a tongue 33 (shown generally U-shaped, but may be any other arbitrary shape) which selectively protrudes from solenoid 17 and fixedly clamps jack 19. As shown in FIG. 1, two jacks 19 may be provided each of which is clamped by a corresponding solenoid 7. A switch 15, mounted externally on housing 12, and in electrical communication with locking element 11, selectively unlocks locking element 11 in order to release wire 16. Switch 15 preferably is a coded switch that includes a plurality of keys or buttons 23 for entering a code for unlocking locking element 11. A display 21 may be provided on housing 12 for displaying signals, characters, numeral or letters, for example, related to the code or upon which the code may be based.

Wire 16 is shown in FIG. 1 as being releasably attached at second point 20 to housing 12. Alternatively, wire 16 may be permanently attached at second point 20 to housing 12. It is also appreciated that circuitry 14 may alternatively be remotely located from electronic seal 10 and in communication therewith.

Figure 5:
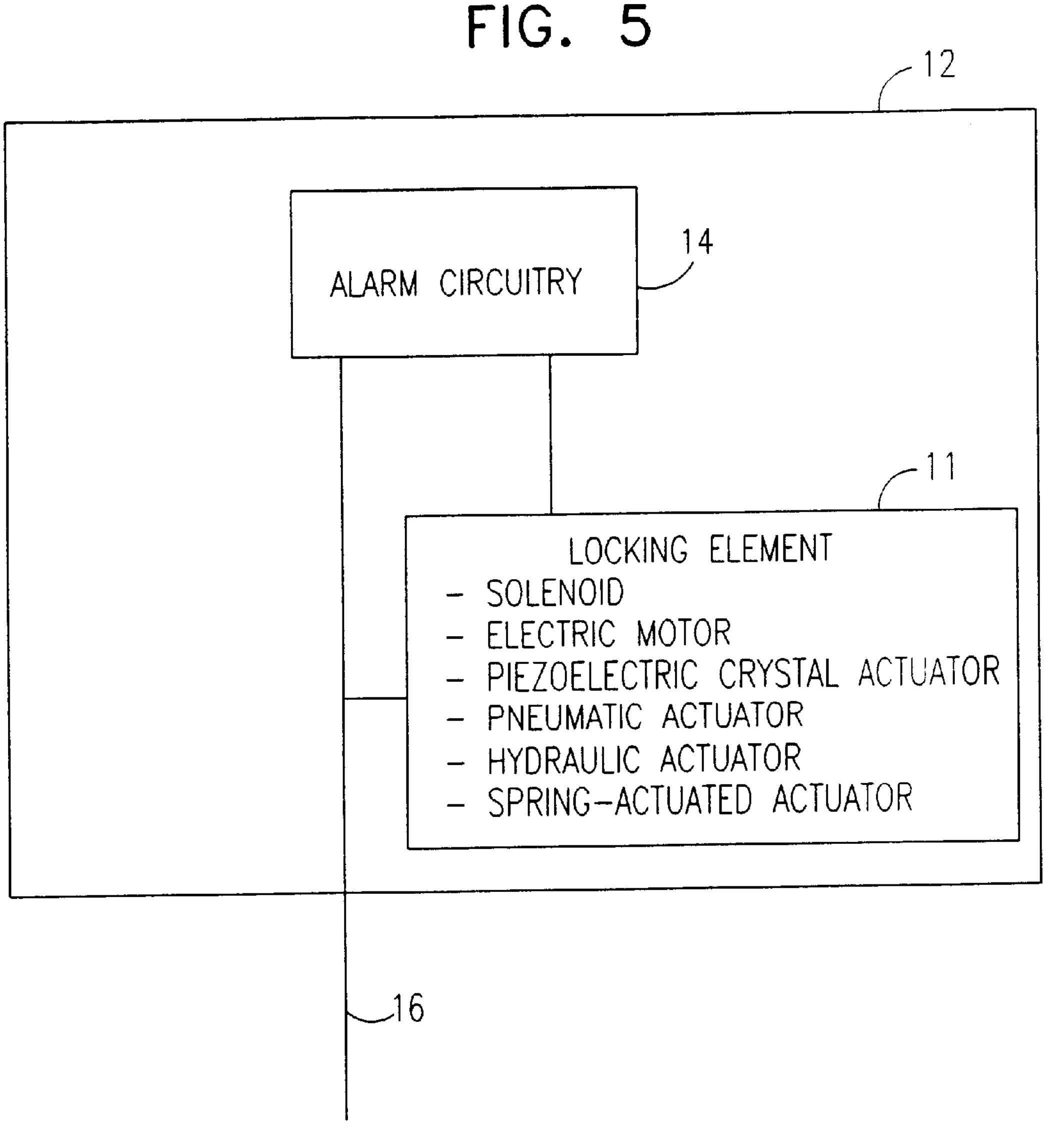
FIG. 5 is a simplified block diagram of illustration of the electronic seal of FIG. 1.

Referring additionally to FIG. 5, it is seen that instead of a solenoid, other actuation apparatus may be used, such as, but not limited to, an electric motor, piezoelectric crystal actuator, pneumatic actuator, hydraulic actuator, or spring-actuated actuator.

Figure 2:
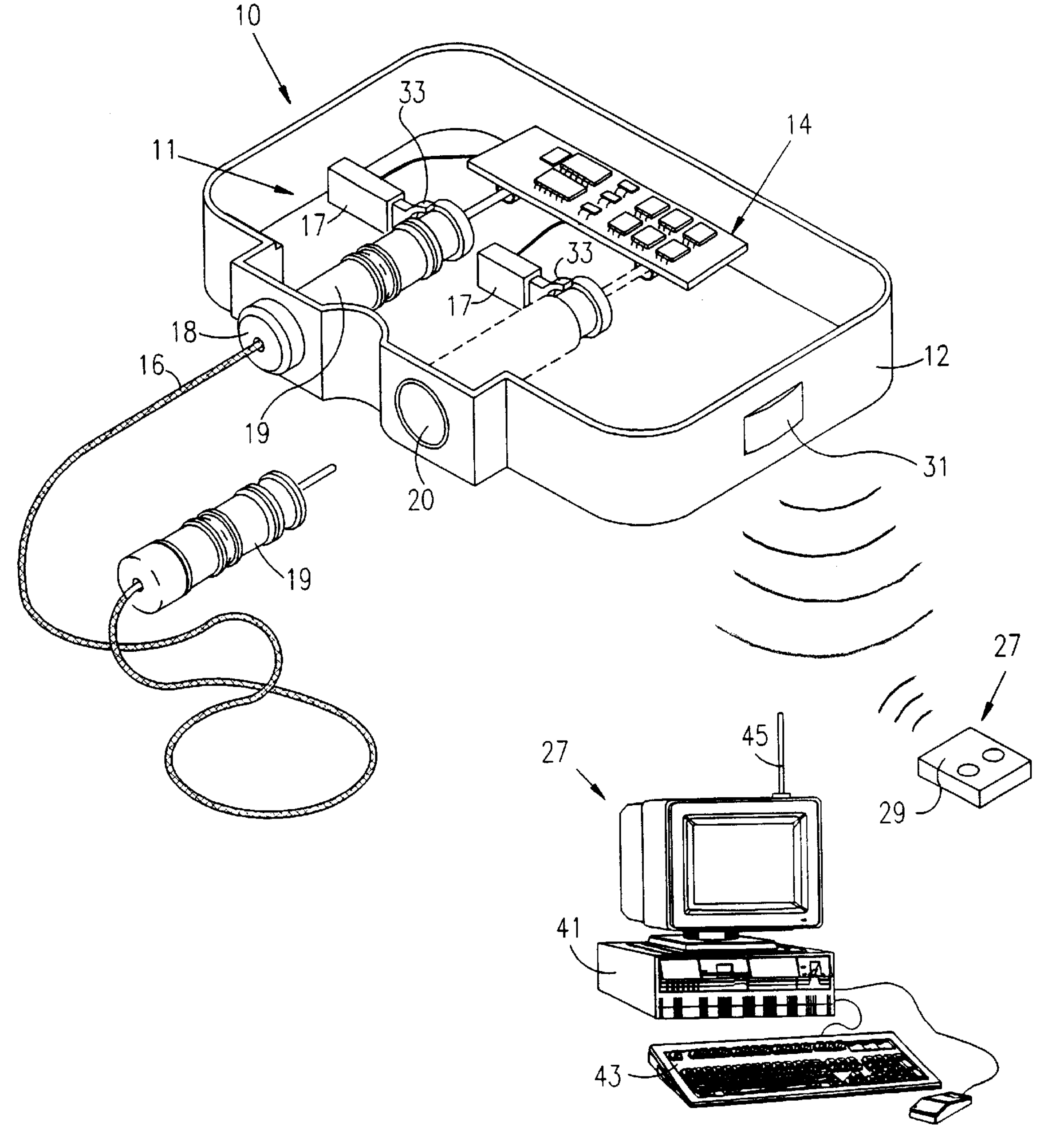
FIG. 2 is a simplified pictorial illustration of an electronic seal constructed and operative in accordance with another preferred embodiment of the present invention.

Reference is now made to FIG. 2 which illustrates electronic seal 10 actuated by a different kind of switch 27 in accordance with another preferred embodiment of the present invention. In this embodiment, the switch 27 may include a remote control device 29 in wireless communication with a transceiver 31 connected to circuitry 14 and solenoids 17. Transceiver 31 preferably not only receives a signal from remote control device 29, but also wirelessly transmits an alarm signal generated by alarm circuitry 14. Alternatively, the remote control device or switch 27 may include a computer terminal 41 and keyboard 43 in wireless communication via a transmitter 45 with transceiver 31. In order to enhance security, the communication may be encrypted. For example, well known encryption algorithms, such as RC-5, DES or DVB, may be employed. To provide an even greater level of trust, mutual zero-knowledge interaction authentication sessions between the remote control device and seal 10 may be held, such as the so-called Fiat-Shamir authentication methods taught in U.S. Pat. No. 4,748,668 to Shamir and Fiat, the disclosure of which is incorporated herein by reference.

Figure 3:
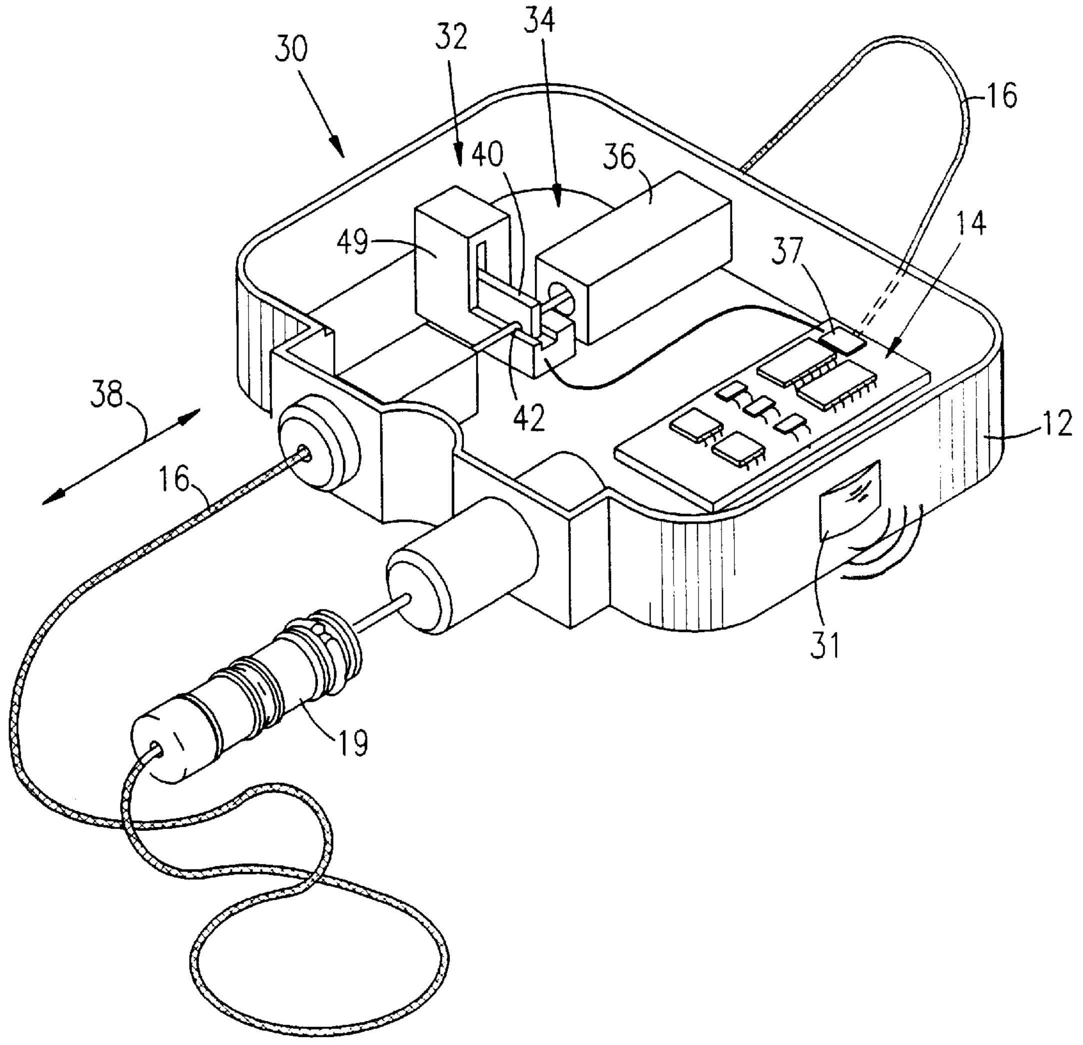
FIG. 3 is a simplified pictorial illustration of an electronic seal constructed and operative in accordance with yet another preferred embodiment of the present invention.

Reference is now made to FIG. 3 which illustrates an electronic seal 30 constructed and operative in accordance with yet another preferred embodiment of the present invention. Electronic seal 30 is preferably similar in construction to seal 10, with like elements being designated by like numerals. Electronic seal 30 differs from seal 10 in that seal 30 includes an adjustment device 32 which comprises a tightening device 34 to which wire 16 is attached. Tightening device 34 preferably includes a conduit 36 through which wire 16 can be drawn out of and pulled into housing 12 (in the directions generally indicated by arrows 38), and a locking element 40 which selectively lockingly engages wire 16 so as to substantially fix wire 16 at a second point 42 thereof Locking element 40 is preferably in electrical communication with alarm circuitry 14 and comprises a solenoid 49 which clamps down on wire 16, for example. Locking element 40 is also preferably in electrical communication with wire 16, so that any attempt to disconnect or detach wire 16 from locking element 40 will be sensed by alarm circuitry 14. Thus, locking element 40 and wire 16 serve as an electronic lock. In this embodiment, wire 16 is preferably, but not necessarily, an unshielded resistive wire whose resistance can be measured from the outside, such as a conductive elastomer, e.g., an elastomeric RF gasket material.

In accordance with a preferred embodiment of the present intention, a portion of wire 16 can be used to form part of a Wheatstone bridge 37, in electrical communication with alarm circuitry 14, for measuring changes in electrical resistance of wire 16.

Figure 4:
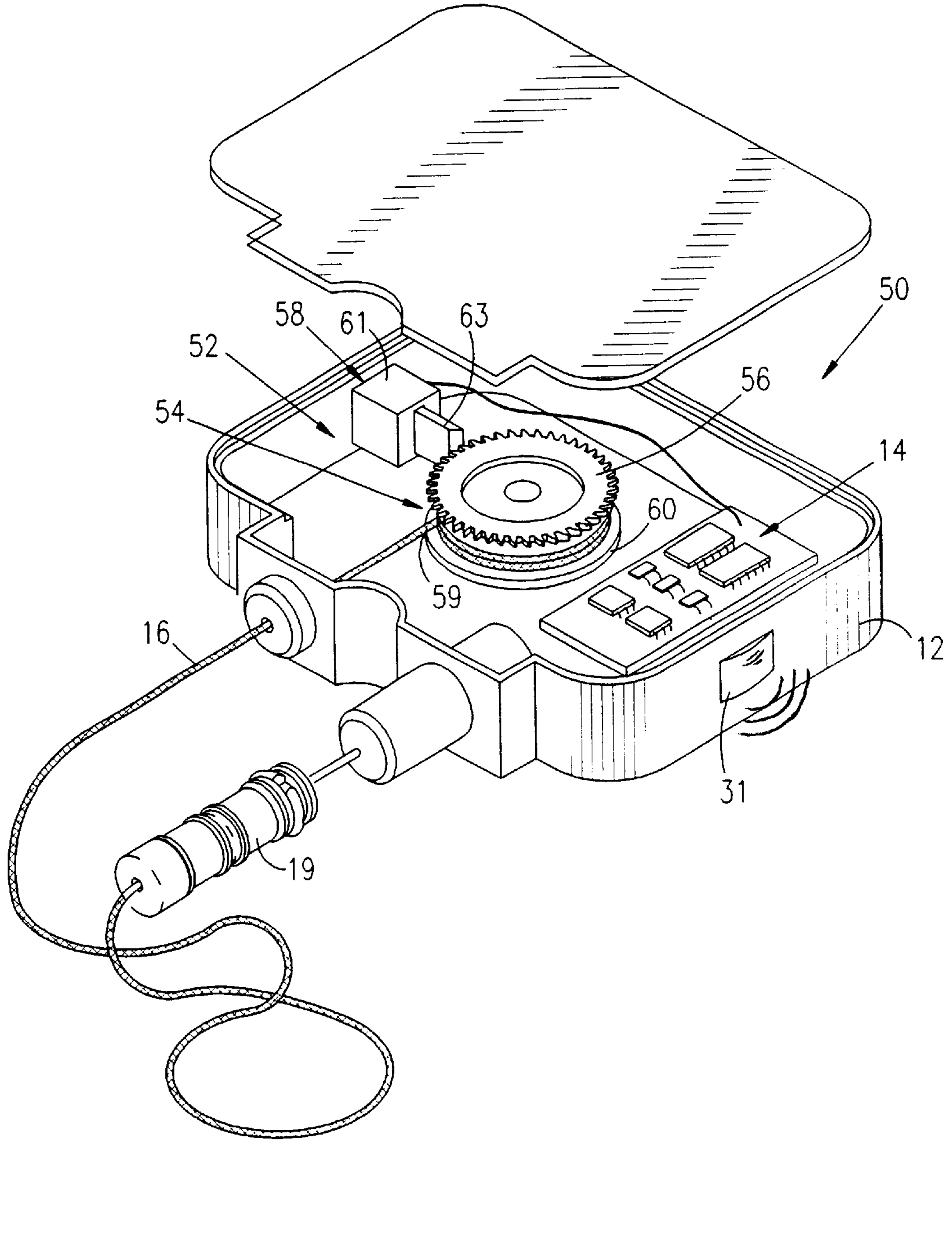
FIG. 4 is a simplified pictorial illustration of an electronic seal constructed and operative in accordance with still another preferred embodiment of the present invention and comprising a bobbin around which the wire is wound.

Reference is now made to FIG. 4 which illustrates an electronic seal 50 constructed and operative in accordance with yet another preferred embodiment of the present invention. Electronic seal 50 is preferably similar in construction to seal 10, with like elements being designated by like numerals. Electronic seal 50 differs from seal 10 in that seal 50 includes an adjustment device 52 which comprises a tightening device 54 to which wire 16 is attached. Tightening device 54 preferably includes a bobbin 56 around which wire 16 is wound and a locking element 58, preferably a solenoid 61, which selectively lockingly engages bobbin 56. Bobbin 56 may include a gear, in which case solenoid 61 preferably includes a tongue 63 which engages the teeth of the gear so as to substantially fix wire 16 at a second point 59 thereof It is appreciated that locking element 58 may be manually or automatically locked and unlocked, as well as by remote control. Preferably the angular position and/or rotation of bobbin 56 is measured by a measuring device 60, such as an encoder. The initial angular position of bobbin 56, i.e., after sealing the object with seal 50, is fed to the alarm circuitry 14. Any angular change in the position of bobbin 56 is then used as a criterion for detection of tampering.

Further embodiments of the invention will now be described which are particularly useful as electronic seals for tying sacks and the like.

It is very common to close sacks, bags and the like by tying them with rope, cord, string, wire, etc., and then seal the tie with some type of inspector's seal which provides an indication of tampering with the seal. Such seals are generally mechanical in nature, such as the familiar lead seal lug on electrical meters, or quality assurance decals on the lids of electronic equipment.

However, electronic seals have not been used in the art for sealing sacks. Although one of the electronic seals described in U.S. patent application Ser. No. 08/815,389 employs resistive wires which when tampered with provide an indication of such tampering, nevertheless these wires are not readily applicable for providing a tampering indication when tied to a sack. One of the reasons is that the wires have a fixed length and after tying there is a portion of the wires which is inevitably left loose or dangling. If any portion of the wire is tampered with, dangling or not, an alarm will be sounded. However, in general, the alarm will be indicative of an actual attempt to break into the sack only if the part of the wire that is wrapped around and actually sealing the sack is tampered with. On the other hand, tampering with the dangling part is not necessarily indicative of an attempt to pilfer or tamper with the contents of the sack, and thus would constitute a false alarm.

Figure 6:
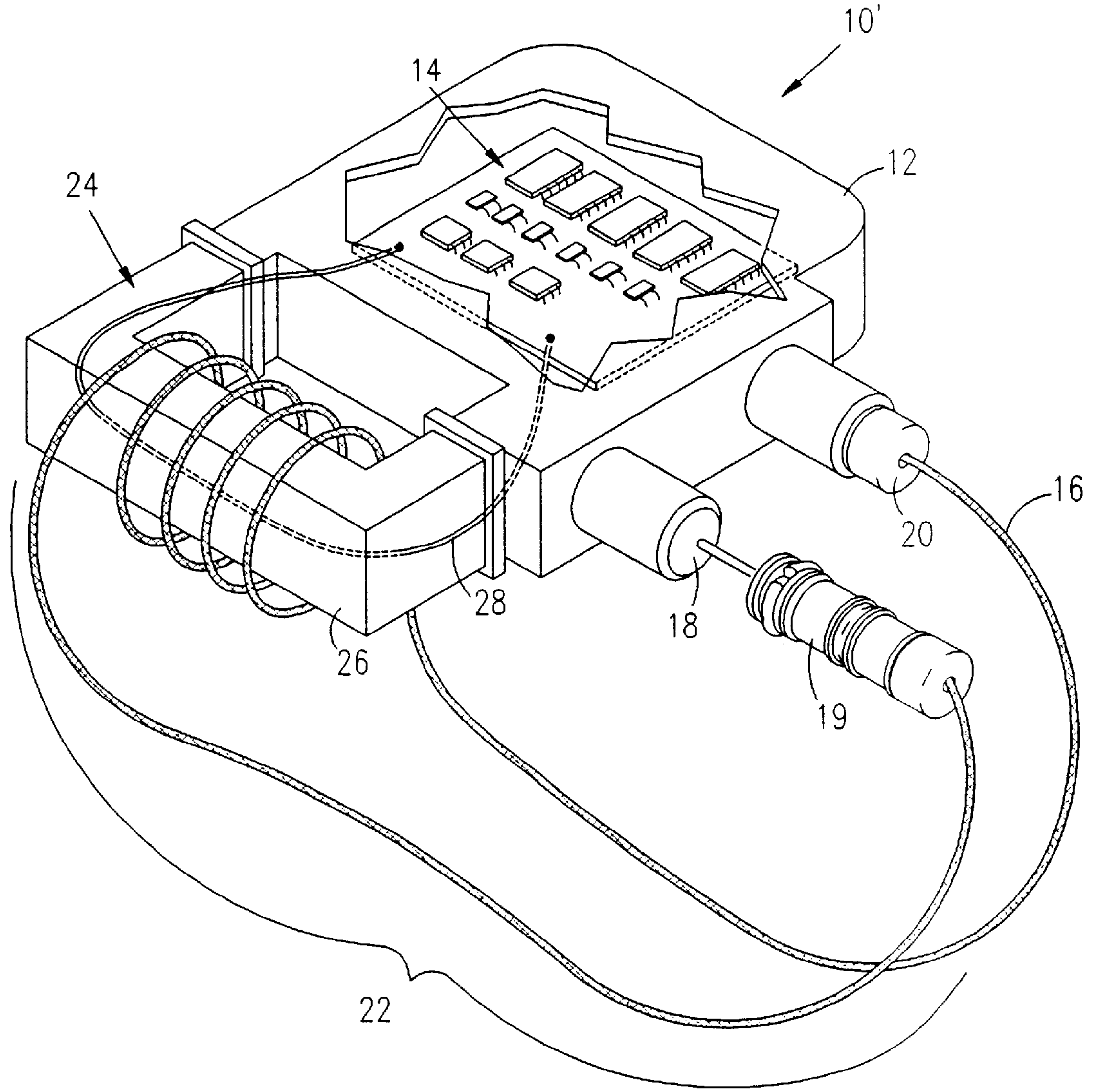
FIG. 6 is a simplified pictorial illustration of an electronic seal constructed and operative in accordance with another preferred embodiment of the present invention and comprising a yoke for wrapping therearound a wire.

Reference is now made to FIG. 6 which illustrates an electronic seal 10' constructed and operative in accordance with a preferred embodiment of the present invention, and which is particularly useful as a seal for tying and securing, a sack and the like.

Electronic seal 10' is preferably similar in construction to seal 10, with like elements being designated by like numerals. In electronic seal 10', a tying portion 22 of wire 16 is defined between first and second points 18 and 20 which is suitable for tying an object, such as a sack or hasp, for example. Tampering with any portion of wire 16 actuates alarm circuitry 14, as described hereinabove.

Figure 7:
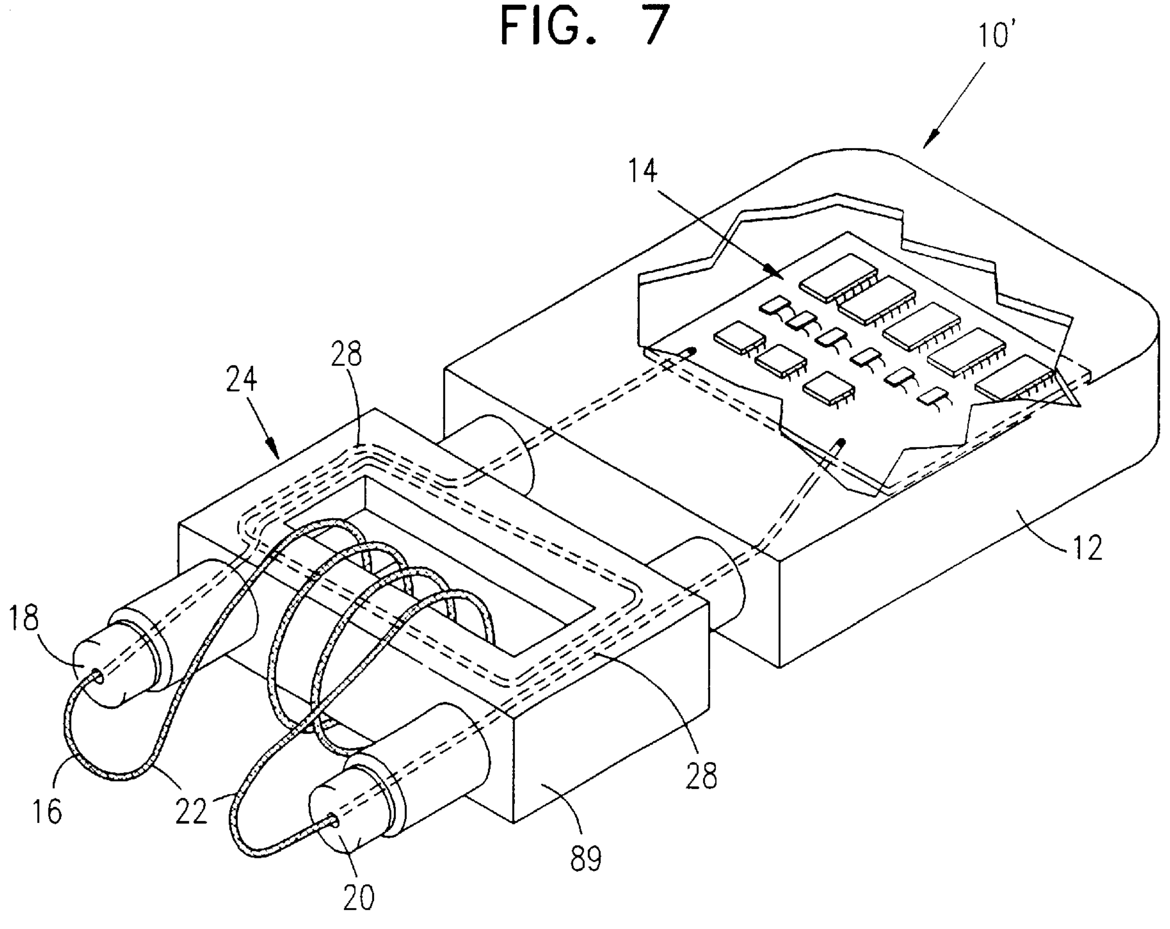
FIG. 7 is a simplified pictorial illustration of an electronic seal constructed and operative in accordance with yet another preferred embodiment of the present invention and comprising an extender yoke for wrapping therearound a wire.

In order not to have an unwanted dangling portion of wire 16 after tying the object, an adjustment device 24 is provided for adjusting a length of tying portion 22. In the embodiment of FIG. 6, adjustment device 24 comprises a yoke 26 for wrapping, therearound tying portion 22. Typically a user ties an object with wire 16, jack 19 being the tree end of wire 16 during tying, and wraps any extra wire around yoke 26. Thereafter, jack 19 is fixedly connected to housing 12 at first point 18, and seal 10 is ready for monitoring any tampering with the object. An electrical element 28, such as an electrically resistive element or a conductive wire, is disposed through yoke 26, electrical element 28 being in electrical communication with alarm circuitry 14. Tampering with yoke 26, or with the windings of wire 16 therearound, causes a change in electrical resistance, capacitance or any other electrical parameter, of electrical element 28, which change is communicated to alarm circuitry 14 for actuation thereof Reference is now made to FIG. 7 which illustrates an alternative version of seal 10' wherein yoke 26 is replaced by an extender yoke 89. In this embodiment, first and second points 18 and 20 are electrical connectors mounted on an external surface of extender yoke 89. In this embodiment, electrical element 28 is routed through the entire inner structure of extender yoke 89. Except for the aforementioned differences, the embodiment of FIG. 7 operates identically to the embodiment of FIG. 6.

It is noted that the embodiments of FIGS. 1 and 2, if provided with a sufficient length of wire 16 between first and second points 18 and 20, can be used to tie and secure sacks and the like, although these embodiments lack an adjustment device.

However, the embodiments of FIGS. 3 and 4 can readily be used to tie and secure sacks and the like, wherein the adjustment device 32 and 52 are provided which comprise tightening devices 34 and 54, respectively, as described hereinabove.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. An electronic seal comprising:

a portable housing;

alarm circuitry which when actuated provides an alarm signal;

a wire extending from said housing and in electrical communication with said alarm circuitry, whereby tampering with said wire causes actuation of said alarm circuitry;

a locking element which selectively lockingly engages said wire to said housing; and a coded switch in electrical communication with said locking element which selectively unlocks said locking element to release said wire and prevent actuation of said alarm circuitry.

2. The electronic seal according to claim 1, wherein said alarm circuitry detects an open circuit in a circuit comprising said alarm circuitry and at least one of said wire and said locking element.

3. The electronic seal according to claim 1, wherein said switch is mounted on an external surface of said housing.

4. The electronic seal according to claim 1, wherein said switch comprises a remote control device.

5. The electronic seal according to claim 4, wherein said remote control device communicates with said seal by means of encrypted communication.

6. The method according to claim 5, wherein said encrypted communication comprises a mutual zero-knowledge interaction authentication session.

7. The electronic seal according to claim 4, wherein said remote control device comprises a computer terminal in wireless communication with said housing.

8. The electronic seal according to claim 1, wherein said locking element comprises a solenoid which selectively lockingly engages said wire.

9. The electronic seal according to claim 8, wherein said solenoid comprises a tongue which selectively protrudes from said solenoid and fixedly clamps said wire.

10. The electronic seal according to claim 8, wherein said wire is connected to an electrical jack and said solenoid comprises a tongue which selectively protrudes from said solenoid and fixedly clamps said jack.

11. The electronic seal according to claim 8, wherein said wire is wound around a bobbin and said solenoid selectively fixedly clamps said bobbin, thereby also clamping said wire.

12. The electronic seal according to claim 1, wherein said locking element is selected from the group consisting of an electric motor, a piezoelectric crystal actuator, a pneumatic actuator, a hydraulic actuator, and a spring-actuated actuator.

13. The electronic seal according to claim 1, wherein said wire which extends from said housing is attached at a first point and at a second point thereof to said housing, and a portion of said wire between said first and second points, called a tying portion, is suitable for tying an object, wherein tampering with said wire actuates said alarm circuitry, and the seal further comprises an adjustment device for adjusting a length of said tying portion.

14. An electronic seal comprising:

a housing comprising alarm circuitry, said alarm circuitry, when actuated providing an alarm signal;

a wire extending from said housing and in electrical communication with said alarm circuitry, whereby tampering with said wire causes actuation of said alarm circuitry, said wire being attached at a first point and at a second point thereof to said housing, a portion of said wire between said first and second points, called a tying portion, being suitable for tying an object, wherein tampering with said wire actuates said alarm circuitry;

a locking element which selectively lockingly engages said wire to said housing; and a coded switch in electrical communication with said locking element which selectively unlocks said locking element to release said wire and prevent actuation of said alarm circuitry; and an adjustment device for adjusting a length of said typing portion.

15. The electronic seal according to claim 14, wherein said adjustment device comprises a yoke for wrapping therearound said tying portion.

16. The electronic seal according to claim 15, wherein an electrical element is disposed through said yoke, said electrical element being in electrical communication with said alarm circuitry, wherein a change in an electrical parameter of said electrical element is communicated to said alarm circuitry for actuation thereof.

17. The electronic seal according to claim 14, wherein said adjustment device comprises a tightening device to which said wire is attached, said tightening device permitting said wire to be drawn out of and to be pulled into said housing, and substantially fixing said wire at said second point thereof.

18. The electronic seal according to claim 17, wherein said tightening device comprises a locking element which selectively lockingly engages said wire.

19. The electronic seal according to claim 17, wherein said tightening device comprises a bobbin around which said wire is wound and a locking element which selectively lockingly engages said bobbin.

20. The electronic seal according to claim 17, and further comprising a measuring device that measures a change in angular position of said bobbin, said measuring device using said change to actuate said alarm circuitry.

21. The electronic seal according to claim 14, wherein a portion of said wire forms part of a Wheatstone bridge in electrical communication with said alarm circuitry for measuring changes in electrical resistance of said wire.

22. The electronic seal according to claim 14, wherein said first point is attached to an electrical connector in electrical communication with said alarm circuitry.

* * * * *